(12) United States Patent
Fagerlund et al.

(10) Patent No.: US 8,387,666 B2
(45) Date of Patent: Mar. 5, 2013

(54) NOISE CONTROL FOR FLUID PRESSURE REDUCTION DEVICE FOR HIGH PRESSURE DROP RATIO

(75) Inventors: Allen C. Fagerlund, Marshalltown, IA (US); Daniel Eilers, Marshalltown, IA (US); Michael W. McCarty, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 58 days.

(21) Appl. No.: 13/035,619

(22) Filed: Feb. 25, 2011

(65) Prior Publication Data

US 2011/0214764 A1   Sep. 8, 2011

Related U.S. Application Data

(60) Provisional application No. 61/310,568, filed on Mar. 4, 2010.

(51) Int. Cl.
*F16K 47/08* (2006.01)

(52) U.S. Cl. .... 138/42; 138/40; 137/625.3; 137/625.33; 137/625.37; 251/118

(58) Field of Classification Search ............ 138/43, 138/40; 137/625.3, 625.37, 625.33; 251/43, 251/42, 118
See application file for complete search history.

(56) References Cited

U.S. PATENT DOCUMENTS

| | | | |
|---|---|---|---|
| 3,853,146 A | | 12/1974 | Blair |
| 3,971,411 A | * | 7/1976 | Baumann .................. 137/625.3 |
| 4,024,891 A | * | 5/1977 | Engel et al. ............... 137/625.3 |
| 4,047,540 A | | 9/1977 | Orme et al. |
| 4,105,048 A | * | 8/1978 | Self ........................... 138/42 |
| 4,127,146 A | * | 11/1978 | Self ........................... 137/625.3 |
| 4,148,340 A | | 4/1979 | Hutton |
| 4,384,592 A | * | 5/1983 | Ng ............................ 137/625.37 |
| 4,921,014 A | * | 5/1990 | Tartaglia et al. ........... 137/625.3 |
| 5,769,122 A | * | 6/1998 | Baumann et al. .......... 137/625.33 |
| 5,941,281 A | * | 8/1999 | Baumann et al. .......... 137/625.33 |
| 6,026,859 A | * | 2/2000 | Wears et al. ............. 137/625.33 |
| 6,244,297 B1 | * | 6/2001 | Baumann .................. 137/625.3 |
| 6,615,874 B2 | * | 9/2003 | Thurston et al. ........... 138/42 |
| 6,718,633 B1 | * | 4/2004 | Glenn et al. .............. 29/890.124 |
| 7,195,034 B2 | * | 3/2007 | Shea ......................... 137/625.37 |
| 7,320,340 B2 | * | 1/2008 | Bush et al. ................ 138/42 |
| 7,766,045 B2 | * | 8/2010 | Fagerlund et al. ......... 138/42 |
| 2003/0136454 A1 | * | 7/2003 | Thurston et al. ........... 138/42 |
| 2008/0023086 A1 | | 1/2008 | Fagerlund et al. |
| 2010/0175768 A1 | * | 7/2010 | Haines ...................... 138/42 |

FOREIGN PATENT DOCUMENTS

| | | |
|---|---|---|
| DE | 30 45 057 A1 | 6/1982 |
| EP | 0 591 873 A1 | 4/1994 |
| EP | 1566585 A1 | 8/2005 |
| EP | 1 750 045 A2 | 2/2007 |

(Continued)

OTHER PUBLICATIONS

International Search Report for PCT/US2011/025619 dated May 18, 2011.

(Continued)

*Primary Examiner* — Patrick F Brinson
(74) *Attorney, Agent, or Firm* — Marshall, Gerstein & Borun LLP (57) ABSTRACT

An improved fluid pressure reduction device including a perimeter and a hollow center aligned along a longitudinal axis, and further including an inlet region at the hollow center and an outlet region at the perimeter, wherein the outlet region includes multiple dimensioned outlet areas arranged to substantially reduce outlet tone generation.

22 Claims, 4 Drawing Sheets

FOREIGN PATENT DOCUMENTS

| | | |
|---|---|---|
| GB | 1 491 788 A | 11/1977 |
| GB | 2443418 A | 5/2008 |
| WO | WO-01/31242 A1 | 5/2001 |

OTHER PUBLICATIONS

Written Opinion of the International Searching Authority for PCT/US2011/025619 dated May 18, 2011.

* cited by examiner

NOISE CONTROL FOR FLUID PRESSURE REDUCTION DEVICE FOR HIGH PRESSURE DROP RATIO

CROSS REFERENCE TO RELATED APPLICATION

This application claims priority to U.S. Provisional Application No. 61/310,568, filed Mar. 4, 2010, the entire contents of which are expressly incorporated herein by reference.

FIELD OF THE INVENTION

This disclosure relates generally to fluid pressure reduction devices, and more particularly, to an improvement of fluid pressure reduction devices to eliminate a tone or a peak frequency emitted from the device.

BACKGROUND OF THE INVENTION

In process control industry applications, many control systems vent to atmosphere and are generally very noisy because of the high pressure ratios and high exit velocities involved. A properly designed vent, in combination with a properly sized valve, can reduce the overall system noise level as much as 40 dBA. Venting gas or steam to atmosphere is a common process. Examples systems may include backpressure control on a steam header or a controlled, overpressure protection system. A vent system has two potential noise sources that can generate unacceptable, high noise levels: 1) the control valve and 2) the exit point or vent. The control valve, usually inside the building or otherwise in the vicinity of plant employees, will have high noise potential due to the low downstream pressure and the associated high pressure drop. The exit point or vent at the top of the vent stack generates substantial noise as the exiting fluid creates its own jet(s) and turbulence. Controlling the noise from these sources is vital to meeting plant boundary or fence-line noise limits as well as meeting the both regulatory and plant requirements for protection of workers. Valve trim and Diffusers are fluid pressure reduction devices that are typically used to reduce turbulent fluid streams and reduce outlet jet interaction to control noise in process control applications.

For example, typical diffusers are constructed from a hollow housing including a series of passageways throughout the housing walls that connect inlets along the interior surface or inner perimeter to outlets along the exterior surface or outer perimeter of the diffuser. Generally, fluid is admitted into the hollow center of the diffuser and passed through the passageways to the exterior surface. It is understood by one of ordinary skill in the art that conventional diffusers provide noise control by: 1) using multistage pressure reduction within the diffuser housing to divide fluid power between stages and correspondingly reduce acoustic conversion efficiency; 2) shifting the frequency spectrum of the resultant acoustic energy outside the audible range; 3) maintaining exit jet independence to avoid noise regeneration due to jet interaction or coalescence; and 4) managing the velocity of the outlet jets by expanding areas to accommodate the expanding gas. These conventional design techniques address noise issues spanning a broad frequency spectrum. However, it has been discovered that certain fluid pressure reduction applications may experience an additional phenomena resulting from symmetric outlet geometries that yield an undesirable specific tone or peak frequency or multiple peak frequencies.

That is, when outlet geometries are symmetric in area, dimension, and/or location, jets may interact and produce a specific tone or frequency related to the jet interactions under such conditions. Conventional approaches to de-tune or attenuate these tones include decreasing inlet-to-outlet area ratios within the device, reducing the number of inlets available within the device, or adding a baffle around the device. Unfortunately, either such technique may reduce overall fluid capacity of a system or valve. To maintain a given fluid capacity for such a device, the height or the overall diameter of the fluid pressure reduction device must increase. This technique is not viable in certain applications of diffusers or valve trim. For example, increases in stack height or device diameter may make the structure too large to fit within design envelope related to duct work or valve body size and may also be too costly to manufacture. Accordingly, it is desirable to create an improved fluid pressure reduction device that eliminates such objectionable tones or peak frequencies.

SUMMARY OF THE INVENTION

In an example fluid pressure reduction device, the device comprises two or more stackable annular plates forming a hollow housing that defines an inner surface and an outer surface. An inlet section comprising a plurality of inlets disposed at the inner surface being operatively couple to outer surface via internal passageways. An outlet section comprising a plurality of outlets defining a first outlet area and a second outlet area being disposed at the outer surface being operatively coupled to the internal passageways to provide a fluid path from the inner surface to the outer surface such that the plurality of outlets are arranged to substantially reduce an outlet jet interaction.

In another example fluid pressure reduction device, the device comprises two or more stackable annular plates forming a hollow housing defining an inner perimeter and an outer perimeter having a plurality of inlets disposed at the inner perimeter being operatively couple to outer perimeter via internal passageways. A plurality of outlets disposed at the outer perimeter being operatively coupled to the internal passageways to provide a fluid path from the inner perimeter to the outer perimeter. The outlets comprising at least a first dimensioned outlet and a second dimensioned outlet. The outlets being dimensioned such that a first outlet jet velocity of the first dimensioned outlet is substantially dissimilar to a second outlet jet velocity of the second dimensioned outlet at a pre-determined radial distance from the outer perimeter.

In yet another example fluid pressure reduction device, the device comprises a hollow cylinder defining an inner perimeter and an outer perimeter. A plurality of inlets are disposed at the inner perimeter and operatively coupled to outer perimeter via internal passageways. A plurality of outlets disposed at the outer perimeter being operatively coupled to the internal passageways to provide a fluid path from the inner perimeter to the outer perimeter. The outlets having at least a first dimensioned outlet and a second dimensioned outlet and disposed on the outer perimeter of the housing such that the at least first dimensioned outlets and the at least second dimensioned outlets are arranged to substantially reduce a peak acoustic frequency produced by the fluid pressure reduction device.

In another example fluid pressure reduction device, the device comprises a hollow cylinder having a plurality of apertures defining passageways providing fluid communication from an inner surface of the cylinder to an outer surface of the cylinder. The fluid pressure reduction device having at least two different dimensioned outlet areas wherein similar dimensioned outlet areas are positioned in a non-repeating pattern to substantially reduce outlet tone generation.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures, in which:

DETAILED DESCRIPTION

Figure 1:
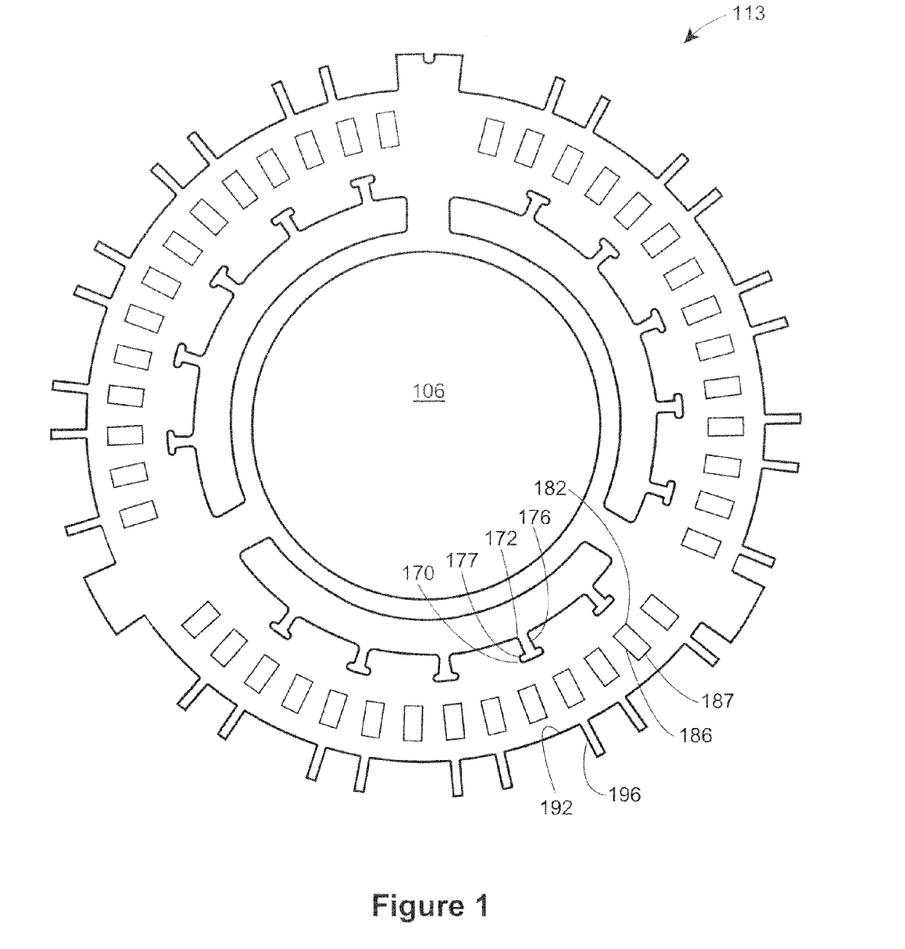
FIG. 1 is a top view of a flow plate of a diffuser in accordance with an example fluid pressure reduction device.
Figure 2:
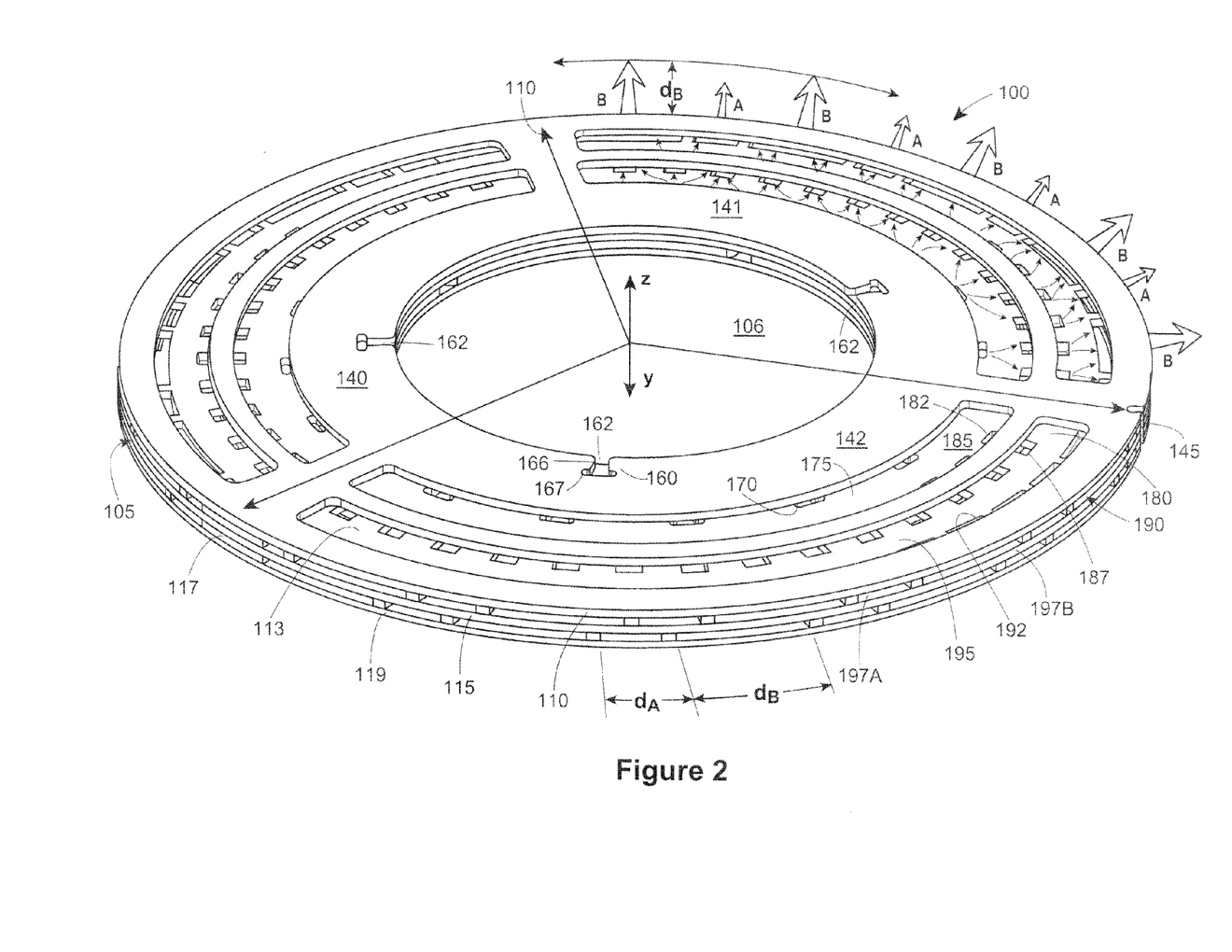
FIG. 2 is a perspective view of a stacked plate assembly in accordance with an example fluid pressure reduction device.

An example fluid pressure reduction device for a diffuser is shown in FIGS. 1 and 2. The example fluid pressure reduction device or diffuser uses a stack of annular plates to provide multiple pressure reduction flow paths between inlets and the outlets of the device. The stacked plate assembly may be characterized as follows: 1) the stacked plate assembly has multiple pressure reduction flow paths having inlets at a hollow center and outlets at an outer perimeter radially aligned in individual flow sectors; 2) the pressure reduction flow paths are generally radial and are defined by more than at least two pressure reduction stages coupled in series with each pressure reduction stage being coupled to at least one subsequent pressure reduction stage in an adjacent annular plate; 3) each stage includes one or more apertures where the inner or first and second stage apertures have well-rounded or well-tapered inlet and an abrupt discharge and the outer stage or third or fourth stages have restrictions that provide a predetermined back pressure to control the fluid velocities at the exterior of the device to maintain subsonic flow; and 4) the fluid pressure reduction device comprises at least two different dimensioned outlets arranged to substantially reduce outlet tone generation.

In a first example embodiment, the views of FIGS. 1 and 2 illustrate a diffuser 100 for use in an application where a large volume of fluid, such as steam, is discharged or dumped in a controlled manner. It should be understood that although the example diffuser 100 is described using five annular plates 110, 113, 115, 117 and 119, the diffuser may be comprised of any number of annular plates including variations in stacked height and plate diameter, as required by a specific application, without departing from the spirit and scope of the fluid pressure reduction device described herein. The example diffuser 100 comprises a stacked plate assembly including a stack of annular plates assembled about a longitudinal axis z and aligned along a registration notch 145. The diffuser 100 is formed about a hollow center 106 that provides fluid entry through a series of inlets 162 formed within substantially similar flow sectors 140, 141 and 142 that includes passageways to an outer perimeter 105. The present example diffuser 100 is comprised of a number of annular plate pairs, which define the fluid passageways. In the example diffuser 100, the plate pairs are comprised of flow plates 113 and 117 and plenum plates 110, 115, and 119. Each pair of the annular plates provides a radially aligned first pressure reduction stage, a second pressure reduction stage, a third pressure reduction stage, and a fourth pressure reduction stage. Each pressure reduction stage includes one or more apertures followed by one or more passageways that lead into the apertures of their subsequent stages. The pressure reduction stages and the flow paths of the example diffuser are radially aligned in sectors along individual plates with the pattern of the four pressure reduction stages repeated around the circumference of the example diffuser 100 to form a total of three flow sectors with four stages each. It should be understood that although the example diffuser 100 is described using four pressure reduction stages, the diffuser may be comprised of any number of stages (e.g. two or three pressure reduction stages) without departing from the spirit and scope of the example fluid pressure reduction device 100.

The example diffuser 100 uses a stack of substantially identical annular plate pairs 110,113; 113,115; 115,117 and 117,119, oriented as described below, to provide multiple pressure reduction flow paths between inlets and the outlets of the diffuser 100. The perspective view of FIG. 2 illustrates the diffuser 100 using five plates arranged in two annular plate pairs. Each annular plate pair 110 and 113 may be divided into flow sectors 140, 141, and 142 that connect the flow passageways from the inlets 162 at the hollow center 106 to the outlets 197A and 197B at the outer perimeter 105 of the diffuser 100. More specifically, each sector 140, 141, and 142 comprises at least three flow stages, and preferably four stages, that provide the fluid pressure reduction across the device. The flow stages 160, 170, 180, and 190 may be formed across at least a pair of the annular plates 110 and 113, and preferably, may be formed across three adjacent plates 110, 113 and 115 to provide radial, lateral, and axial flow within the device. The flow characteristics of the example diffuser are described in detail co-pending patent application Ser. No. 11/020,941 (U.S. Patent Application Publication No. 2008/0023086) entitled "Fluid Pressure Reduction Device for High Pressure Drop Ratios." Those desiring more detail should refer to U.S. patent application Ser. No. 11/020,941.

As shown in FIGS. 1 and 2, each pressure reduction stage 160, 170, 180, and 190 includes one or more apertures followed by one or more passageways. A first pressure reduction stage 160 is formed across a first fluid restriction provided by a narrow inlet 162 connecting to a relatively broader outlet 167 by an intermediate passageway 166. A second pressure reduction stage 170 is formed across a multiple second fluid restrictions provided by a narrow inlet 172 connecting to a relatively broad outlet 177 by an intermediate passageway 176 (shown in FIG. 1). A third pressure reduction stage 180 is formed across multiple third fluid restrictions provided through an inlet 182 connecting to an outlet 187 by an intermediate passageway 186, and a fourth pressure reduction stage 190 is formed across a fluid restriction provided through an inlet 192 connecting to outlet 197A and/or 197B by an intermediate passageway 196 (shown in FIG. 1). As illustrated with flow arrows A and B in FIG. 2, the pressure reduction flow paths progress from the hollow center 106 to the outer perimeter 105 of stacked plate assembly with the preferred plate rotational offsets as shown. The annular plates 110 and 113 are provided with a registration notch 145 to align the passageways. Each flow plate 113 and 117 in the stack is preferably rotated relative to adjacent plates. One skilled in the art should appreciate that the preferred orientation may be achieved by rotating the adjacent plates by 180 degrees about the longitudinal or z-axis or flipping adjacent plates about the y axis to align the passageways. The plenum plates 110, 115 and 119 are substantially identical and may be aligned along the registration notch for proper orientation within the stack. With the illustrated rotational orientations, the first stage outlet 167 is aligned with a first plenum 175 in at least one adjacent plate 1130, and preferably a plenum in an adjacent plate 140, so that fluid flow exiting the first stage 160 enters at least the first plenum 175 formed within the adjacent plate 113.

It should be appreciated that the contraction-expansion of the fluid through the nozzle-type restrictions induces the desired pressure drop in the fluid. The relatively lower pressure fluid is collected in the first plenum 175 and transferred under pressure to the outer stages. The flow path may progress through at least two successive plates in the stacked plate assembly and includes radial, lateral, and axial flow components, with a general direction that may be considered "diverging radial" flow with respect to across-section of the stacked plate assembly. As fluid flows through the first plenum 175, it enters the relatively narrow second stage inlets 172 on the adjacent second plate 113. The restrictive second stage inlets accelerate the fluid into the broad second stage outlets 177 inducing a second pressure drop. The fluid from the second stage 170 is collected with second plenum 185 formed in at least the first plenum plate 110, and preferably a second plenum plate 130, wherein the fluid is mixed in radial and lateral directions. Fluid continues to flow from the second stage outlets 177 and into the third stage inlets 182 on the adjacent flow plate 113. The third stage outlets 187 align with the fourth stage inlets 192 on the second plate 113 to direct the fluid through the fourth stage outlets 197A and 197B at the outer perimeter 105 of the stack. The outlets 197A and 197B may be divided by stiffening elements 198, as shown, without adversely affecting the back pressure of the device 100.

As previously described, the pressure reduction flow paths progress from the hollow center 106 to the outer perimeter 105 of stacked plate assembly 100 and are provided by stacking annular plates with rotational offsets as shown. Additionally, one of ordinary skill in the art can also appreciate that the inlets 162 to the first stage may be asymmetrically placed about the hollow center. Asymmetric placement of the inlets 162 of the first stage 160 permits a maximum number of inlets from the hollow center while preventing an axial alignment of such inlets, which may eliminate the formation of columnar axial flows within the stack of plates that may reduce the formation of unacceptable noise levels. It should also be appreciated that the successive flow plate outlets are not aligned along the longitudinal axis.

Prior art fluid pressure reduction devices typically break up jets through a plurality of equivalently dimensioned outlets into the smallest size feasible, with regard to diffuser capacity, and introduced staged pressure drops within the device to control noise. The actual dimensions may vary as an economic design consideration between manufacturing costs and noise attenuation desired. Even though relatively smaller outlets provide greater attenuation, more outlets are required to pass the equivalent flow. This approach adds cost to the device. Additionally, similarly dimensioned outlets may produce a specific peak noise frequency directly related to both the outlet area and outlet jet coalescence at the perimeter of the device. That is, by creating symmetry in the geometry and/or position of the outlets, the similar outlet jets can re-enforce other jets or interact at a radial distance from the perimeter of the device to emit a specific tone or frequency. The example fluid pressure reduction device may substantially reduce specific peak frequency noise generation.

As depicted, the fluid pressure reduction device 100 uses at least two different outlet areas 197A and 197B at the outer perimeter 105 such that the acoustic energy released may not before-enforced at a specific peak frequency or tone. That is, the jet velocity at the outer perimeter 105 is substantially equal. However, it should be appreciated that the resultant frequency from the jets is directly proportional to the ratio of jet velocity and the characteristic dimension of the outlet area. That is, outlet area 197A may have a characteristic dimension of $d_A$ and outlet area 197B may have a characteristics dimension of $d_B$. Beyond the outer perimeter 105, the jet velocities are similar at the characteristic dimension for each respective outlet area. Thus, as the jet proceeds from the outlet, the velocity of outlet jet A at dimension $d_A$ will be substantially equal to the velocity of outlet jet B at dimension $d_B$. Therefore, at a given distance for the outer perimeter, such as a radial distance $d_B$, the velocities of the outlet jets A and B will be substantially dissimilar, thereby yielding different outlet jet frequencies. This arrangement of outlets creates a disruption in jet interaction. By implementing multiple outlet areas 197A and 197B at the perimeter 105 of the fluid pressure reduction device 100, outlet peak frequencies are dispersed, relative to the outlet area, which lowers noise level attributed to each peak frequency.

In the present example fluid pressure reduction device, the ratio of outlet areas 197B- to 197A is preferably 1.2:1. One skilled in the art should appreciate that other ratios may be possible without departing from the spirit and scope of the example fluid pressure reduction device. For example, adjacent outlet areas ratios may be preferably non-integral multiples to avoid harmonic reinforcement of tones. Another such ratios may be based upon multiples of prime numbers. By providing multiple outlet areas of non-integral ratios, the example fluid pressure reduction 100 distributes the outlet tone or frequency across a broader spectrum, thereby substantially eliminating a specific peak tone associated with specific outlet area geometry or dimension.

Figure 3:
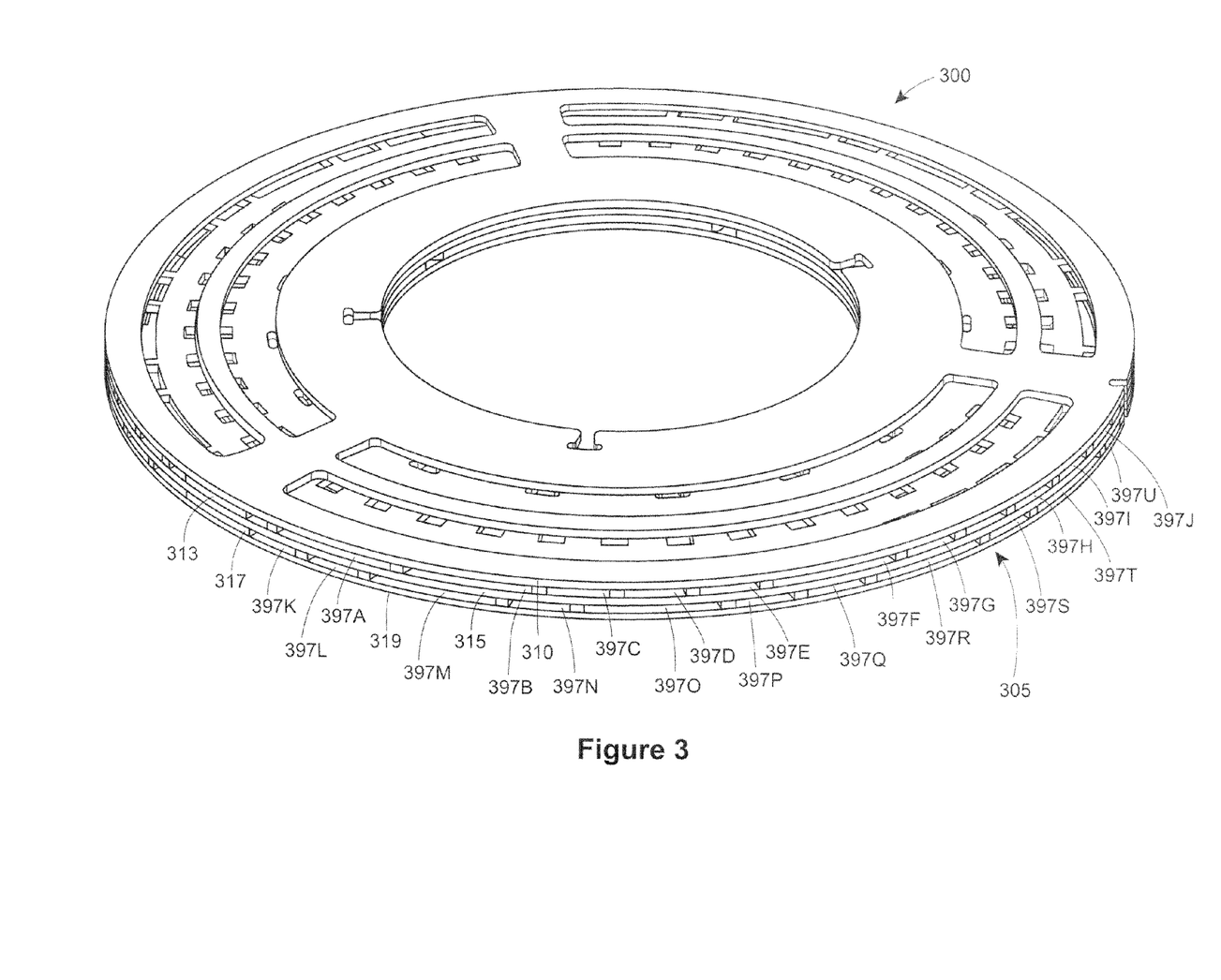
FIG. 3 is a perspective view of a stacked plate assembly in accordance with an example fluid pressure reduction device.

Another example embodiment is shown in FIG. 3. The characteristic tones related to a specific outlet area can be further dispersed by arranging the outlets in an irregular or non-symmetric pattern. The fluid pressure reduction device 100 illustrated in FIG. 2 presents a regular or symmetric pattern. The pattern illustrated by the fluid pressure reduction device 100 is a function of similar flow plates 113, 117 assembled by rotating the same plate about the x axis during assembly. The fluid pressure reduction device 300 illustrated in FIG. 3 is substantially similar to fluid pressure reduction device 100 with the exception that at least two of the flow plates 313 and 317 have dissimilar outlet geometry formation on the perimeter 305. That is, unlike fluid pressure reduction device 100 that utilizes a single flow plate during assembly, the fluid pressure reduction device 300 uses multiple flow plates 313 and 317 paired with similar plenum plates 310, 315 and 319 to achieve an irregular or non-repeating pattern. Although this may slightly increase manufacturing cost, the additional flow plates allow for an irregular outlet placement due to different outlet area position provide during flow plate manufacture. For example, as illustrated in FIG. 3, outlets 397 A, 397 B, 397 F, 397 H, 397 M, 397 O, 397 R, AND 397 T are larger than outlets 397 C, 397 D, 397 E, 397 G, 397 I, 397 J, 397 K, 397 L, 397 N, 397 P, 397 Q, 397 S, AND 397 U. And unlike the diffuser 100 illustrated in FIG. 2, the present example diffuser 300 utilizes a non-repeating placement of the outlets based upon the outlet formation geometry of the flow plates 113 and 117. It is believed that further disrupting the outlet pattern (i.e. both outlet area and outlet position) at the perimeter 305 of the example device 300 will further disrupt jet interaction and coalescence to provide enhanced tone or peak frequency reduction. Of course, one skilled in the art can appreciate that a fluid pressure reduction device such as those describe herein may include any number of flow plate designs and/or outlet area dimensions to enhance peak frequency reduction. Additionally, it may also be beneficial to utilize multiple geometric shapes at the individual outlets to substantially reduce tones or peak frequencies.

Figure 4:
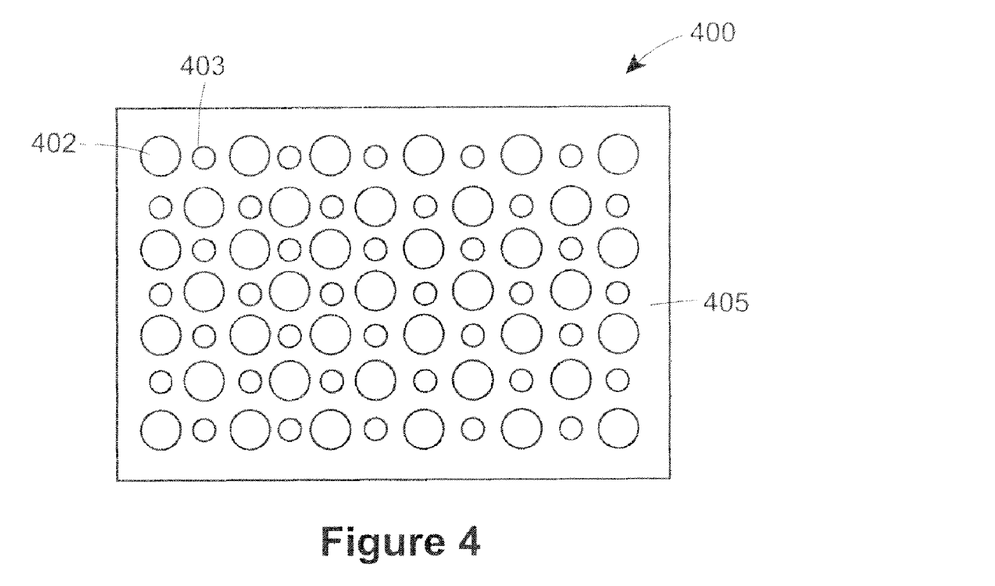
FIG. 4 is side view of an example drilled hole fluid pressure reduction device.

In another example embodiment, FIG. 4 depicts the present invention utilized in a diffuser. The diffuser 400 comprises a hollow cylinder having a plurality of apertures or "through holes" originating at the hollowing center and providing direct fluid passageways to the device perimeter 405. Similar to the stack plate diffuser of the previous embodiment, the diffuser 400 depicted in FIG. 4 utilizes apertures in a non-axial to divide and separate the incoming fluid stream to decrease jet interaction and coalescence to substantially reduce the noise emanating from the device. Specifically, the division of the fluid stream into smaller jets shifts the resultant acoustic energy to higher frequencies, which tends to propagate less efficiently, is more easily attenuated, and includes less energy in the audible range. As previously described, conventional construction of this type of "drilled-hole" device uses outlets of substantially similar outlet areas (i.e. the small drill is used to create the through holes) making the device susceptible to tone re-enforcement at a peak frequency directly related to such outlet areas. The present example embodiment substantially mitigates peak frequency generation by using different dimensioned outlet areas positioned to create additional separation between the outlets to inhibit jet interaction and the subsequent tone re-enforcement. As illustrated in FIG. 4, two different dimensioned outlets 402 and 403 are positioned in alternating manner about the perimeter 405 of the diffuser 400. Such separation of similar dimensioned outlets is sufficient to disperse the resultant outlet jets to substantially reduce peak frequency generation.

Figure 5:
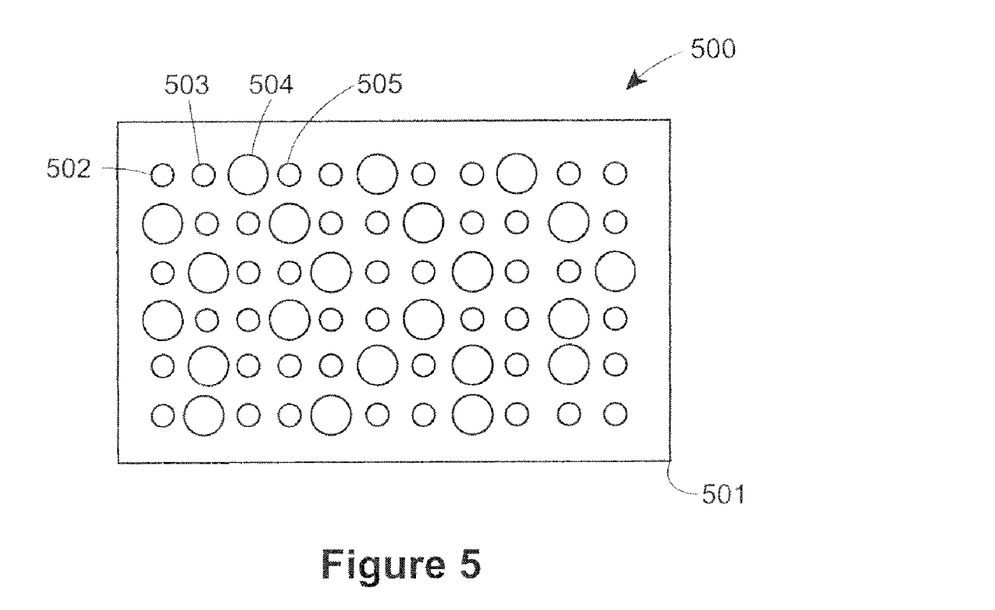
FIG. 5 is side view of an example drilled hole fluid pressure reduction device having non-repeating outlets.

In another example, FIG. 5 depicts a drilled-hole diffuser 500 similar in design to the diffuser illustrated in FIG. 4. The drilled-hole diffuser 500 of FIG. 5 shows a through-hole construction using four different outlet dimensions 502, 503, 504 and 505 arranged in a non-repeating pattern. That is, unlike the diffuser depicted in FIG. 4 that depicts a regular, alternating outlet pattern employing two outlet dimensions, the embodiment of FIG. 5 creates a non-repeating pattern using four different outlet dimensions. For example, such a non-repeating pattern could be based upon a non-repeating interval such as a pseudorandom scheme or a prime number-based scheme.

While there have been shown and described what are at present considered the preferred embodiments of the present invention, it will be obvious to those skilled in the art that various changes and modifications may be made therein without departing from the scope of the invention as defined by the appended claims. For example, it should be appreciated by one of ordinary skill in the art that multiple outlet dimensions may be combined with outlet position to reduce or attenuate multiple peak frequencies present within a fluid pressure reduction device. That is, the noise spectrum may include one or more peak frequencies. By using different dimensioned outlets positioned at predetermined intervals, multiple frequencies may be attenuated. It should further be appreciated that the embodiments illustrated in FIGS. 1 and 2 could be modified such that each plate includes both flow and plenum sectors within a single plate without departing from the spirit and scope of the invention. Further, the examples depicted in FIGS. 4 and 5 could be fabricated from multiple, concentric cylinders to create additional pressure reduction stages prior to the outer perimeter. The principles describe herein may be equally applicable to fluids in gas phase, liquid phase or multiphase applications. Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A fluid pressure reduction device comprising:
   a hollow housing defining an inner surface and an outer surface;
   an inlet section comprising a plurality of inlets disposed at the inner surface being operatively couple to outer surface via internal passageways; and
   an outlet section comprising a plurality of outlets being disposed at the outer surface and operatively coupled to the internal passageways to provide a fluid path from the inner surface to the outer surface, the flow path having radial, lateral, and axial components, and the outlets defining at least a first outlet area and a second outlet area such that the plurality of outlets are arranged to substantially reduce an outlet jet interaction.

2. The fluid pressure reduction device of claim 1, wherein the hollow housing is comprised of a stack of at least two annular plates providing at least a first pressure reduction stage and a second pressure reduction stage radially aligned about a longitudinal axis.

3. The fluid pressure reduction device of claim 1, wherein the hollow housing is comprised of at least a first hollow cylinder providing at least a first pressure reduction stage.

4. The fluid pressure reduction device of claim 1, wherein the outlets are positioned on the outer perimeter of the housing such that the first outlet area is only immediately adjacent to the second outlet area.

5. The fluid pressure reduction device of claim 1, wherein the position of the first outlet area and the position of the second outlet area define a non-repeating sequence.

6. The fluid pressure reduction device of claim 1, wherein the arrangement of the plurality of outlets substantially reduces a peak acoustic frequency of the fluid pressure reduction device.

7. A fluid pressure reduction device comprising:
   a hollow housing defining an inner perimeter and an outer perimeter;
   a plurality of inlets disposed at the inner perimeter and being operatively coupled to the outer perimeter via internal passageways; and
   a plurality of outlets disposed at the outer perimeter and being operatively coupled to the internal passageways to provide a fluid path from the inner perimeter to the outer perimeter, the outlets having at least a first dimensioned outlet and a second dimensioned outlet, the flow path having radial, lateral, and axial components, and the outlets being dimensioned such that a first outlet jet velocity of the first dimensioned outlet is substantially dissimilar to a second outlet jet velocity of the second dimensioned outlet at a pre-determined radial distance from the outer perimeter.

8. The fluid pressure reduction device of claim 7, wherein the hollow housing is comprised of a stack of at least two annular plates providing at least a first pressure reduction stage and a second pressure reduction stage radially aligned about a longitudinal axis.

9. The fluid pressure reduction device of claim 7, wherein the hollow housing is comprised of at least first hollow cylinder providing at least a first pressure reduction stage.

10. The fluid pressure reduction device of claim 7, wherein the outlets are positioned on the outer perimeter of the housing such that the first outlet area is only immediately adjacent to the second outlet area.

11. The fluid pressure reduction device of claim 7, wherein the position of the first outlet area and the position of the second outlet area define a non-repeating sequence.

12. The fluid pressure reduction device of claim 7, wherein the arrangement of the plurality of outlets substantially reduces a peak acoustic frequency of the fluid pressure reduction device.

13. The fluid pressure reduction device of claim 7, wherein the outlets include a third dimensioned outlet.

14. A fluid pressure reduction device comprising:
    a hollow housing defining an inner perimeter and an outer perimeter;
    a plurality of inlets disposed at the inner perimeter and being operatively coupled to the outer perimeter via internal passageways; and
    a plurality of outlets disposed at the outer perimeter and being operatively coupled to the internal passageways to provide a fluid path from the inner perimeter to the outer perimeter, the flow path having radial, lateral, and axial components, the outlets having at least a first dimensioned outlet and a second dimensioned outlet, the outlets being positioned on the outer perimeter of the housing such that the at least first dimensioned outlet and the at least second dimensioned outlet are arranged to substantially reduce a peak acoustic frequency produced by the fluid pressure reduction device.

15. The fluid pressure reduction device of claim 14, wherein the hollow housing is comprised of a stack of at least two annular plates providing at least a first pressure reduction stage and a second pressure reduction stage radially aligned about a longitudinal axis.

16. The fluid pressure reduction device of claim 14, wherein the hollow housing is comprised of first hollow cylinder providing at least a first pressure reduction stage.

17. The fluid pressure reduction device of claim 14, wherein the outlets are positioned on the outer perimeter of the housing such that the first dimensioned outlet is only immediately adjacent to the second dimensioned outlet.

18. The fluid pressure reduction device of claim 14, wherein the position of the first dimensioned outlet and the position of the second dimensioned outlet define a non-repeating sequence.

19. The fluid pressure reduction device of claim 14, wherein the outlets include a third dimensioned outlet.

20. The fluid pressure reduction device of claim 14, wherein the arrangement of the plurality of outlets substantially reduces a second peak acoustic frequency of the fluid pressure reduction device.

21. The fluid pressure reduction device of claim 14, wherein the outlets are positioned on the outer perimeter of the housing such that the first outlet area is only immediately adjacent to the second outlet area.

22. The fluid pressure reduction device of claim 14, wherein the position of the first outlet area and the position of the second outlet area define a non-repeating sequence.

* * * * *

UNITED STATES PATENT AND TRADEMARK OFFICE
CERTIFICATE OF CORRECTION

Page 1 of 1

PATENT NO.        : 8,387,666 B2
APPLICATION NO.   : 13/035619
DATED             : March 5, 2013
INVENTOR(S)       : Fagerlund et al.

It is certified that error appears in the above-identified patent and that said Letters Patent is hereby corrected as shown below:

In the Specification

In Column 5, Line 4, delete "plate 1130," and insert -- plate 113, --, therefor.

In Column 5, Line 16, delete "across-section" and insert -- a cross-section --, therefor.

In Column 6, Line 1, delete "before-enforced" and insert -- be re-enforced --, therefor.

Signed and Sealed this
Seventeenth Day of March, 2015

Michelle K. Lee
*Director of the United States Patent and Trademark Office*